(12) United States Patent
Sharma et al.

(10) Patent No.: US 12,499,098 B2
(45) Date of Patent: Dec. 16, 2025

(54) GENERATING A SCHEMA GRAPH OF SUB-TABLES IN A DATABASE FOR QUERIES USING A LARGE LANGUAGE MODEL

(71) Applicant: Adobe Inc., San Jose, CA (US)

(72) Inventors: Chetan Sharma, Agra (IN); Ramasuri Narayanam, Bangalore (IN); Shaddy Garg, Baghapurana (IN); Shiv Kumar Saini, Bengaluru (IN); Siddhartha K Goel, Noida (IN); Som Satapathy, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/409,490

(22) Filed: Jan. 10, 2024

(65) Prior Publication Data
US 2025/0225108 A1   Jul. 10, 2025

(51) Int. Cl.
| | | |
|---|---|---|
| *G06F 16/00* | (2019.01) | |
| *G06F 16/21* | (2019.01) | |
| *G06F 16/242* | (2019.01) | |
| *G06F 16/2455* | (2019.01) | |

(52) U.S. Cl.
CPC .......... *G06F 16/212* (2019.01); *G06F 16/243* (2019.01); *G06F 16/2455* (2019.01)

(58) Field of Classification Search
CPC ... G06F 16/212; G06F 16/243; G06F 16/2455
See application file for complete search history.

(56) References Cited

U.S. PATENT DOCUMENTS

| | | | |
|---|---|---|---|
| 2003/0078915 A1* | 4/2003 | Chaudhuri | ........ G06F 16/24578 |
| 2006/0122993 A1* | 6/2006 | Dettinger | .......... G06F 16/24526 |
| 2009/0112835 A1* | 4/2009 | Elder | ...................... F16K 15/16 |
| 2010/0121837 A1* | 5/2010 | Vergnory-Mion | ...... G06F 16/20 |
| | | | 707/E17.014 |

(Continued)

OTHER PUBLICATIONS

Bird, Steven, Edward Loper and Ewan Klein (2009), Natural Language Processing with Python. O'Reilly Media Inc.

(Continued)

*Primary Examiner* — Syed H Hasan
(74) *Attorney, Agent, or Firm* — Keller Preece PLLC

(57) ABSTRACT

The present disclosure relates to systems, non-transitory computer-readable media, and methods for linking a database schema to a natural language query. In particular, in some embodiments, the disclosed systems determine, from tables in a database schema, a subset of tables relevant to a natural language query by comparing embeddings for the tables in the database schema and embeddings for the natural language query. Additionally, in some implementations, the disclosed systems select, from a schema graph comprising nodes that represent the tables in the database schema, an additional table along a path between a pair of nodes representing a pair of tables from the subset of tables. Moreover, in some embodiments, the disclosed systems determine a set of relevant tables by appending the additional table to the subset of tables. Furthermore, in some implementations, the disclosed systems generate, from the set of relevant tables, a response for the natural language query.

20 Claims, 10 Drawing Sheets

(56) References Cited

U.S. PATENT DOCUMENTS

| | | | | |
|---|---|---|---|---|
| 2011/0035368 | A1* | 2/2011 | Cole | G06F 16/24544 707/E17.017 |
| 2015/0363469 | A1* | 12/2015 | Peloski | G06F 16/24556 707/741 |
| 2019/0258743 | A1* | 8/2019 | Convertino | G06F 16/90 |
| 2023/0169075 | A1* | 6/2023 | Han | G06F 16/243 707/769 |

OTHER PUBLICATIONS

Fu, H., Liu, C., Wu, B., Li, F., Tan, J., & Sun, J. (2023). CatSQL: Towards Real World Natural Language to SQL Applications. Proceedings of the VLDB Endowment, 16(6), 1534-1547.

Hu, Y., Zhao, Y., Jiang, J., Lan, W., Zhu, H., Chauhan, A., . . . & Xiang, B. (2023). Importance of synthesizing high-quality data for text-to-SQL parsing.

Li, H., Zhang, J., Li, C., & Chen, H. (Jun. 2023). Resdsql: Decoupling schema linking and skeleton parsing for text-to-sql. In Proceedings of the AAAI Conference on Artificial Intelligence (vol. 37, No. 11, pp. 13067-13075).

Li, J., Hui, B., Cheng, R., Qin, B., Ma, C., Huo, N., . . . & Li, Y. (2023). Graphix-t5: Mixing pre-trained transformers with graph-aware layers for text-to-sql parsing. arXiv preprint arXiv:2301.07507.

Pourreza, M., & Rafiei, D. (2023). Din-sql: Decomposed in-context learning of text-to-sql with self-correction. arXiv preprint arXiv:2304.11015.

Sun, R., Arik, S. O., Nakhost, H., Dai, H., Sinha, R., Yin, P., & Pfister, T. (2023). SQL-PaLM: Improved Large Language Model Adaptation for Text-to-SQL. arXiv preprint arXiv:2306.00739.

Yale Semantic Parsing and Text-to-SQL Challenge. "Spider 1.0". Website <https://yale-lily.github.io/spider> Website for the LILY group at Yale University. 5 pages. Nov. 2023.

* cited by examiner

GENERATING A SCHEMA GRAPH OF SUB-TABLES IN A DATABASE FOR QUERIES USING A LARGE LANGUAGE MODEL

BACKGROUND

Recent years have seen developments in hardware and software platforms for accessing and manipulating databases. For example, many entities utilize databases to organize and store large quantities of digital data. Additionally, such entities utilize structured database queries to extract specific digital information from the databases for display at other computing devices. Given the large amounts of digital data that are often stored in databases, executing structured database queries to determine types and locations of digital information within a database that are relevant to an intent underlying the structured database queries is a crucial and challenging task in managing digital data.

Although conventional systems can provide information from a database in response to a structured database query, such systems have a number of problems in relation to flexibility of operation and efficiency. For instance, conventional systems are often inflexible in that they require the rigid syntax of a structured database query. Specifically, conventional systems often require the query to be stated (e.g., by a user or computer program) in a structured query language (SQL) format.

While some conventional systems attempt to improve the flexibility of database queries by utilizing machine learning models to formulate structured database queries, such systems often are unable to parse relevant information from a database due to an excessive amount of data in the database. For example, conventional systems often require excessive computational resources (e.g., memory, storage, bandwidth, etc.) to execute queries on large amounts of data across many different tables in the databases. Additionally, conventional systems that utilize machine learning to execute queries on databases also suffer from resource costs associated with making large quantities of calls (e.g., via application programming interfaces) to machine learning models for each query. Thus, conventional systems often suffer from inefficient operation.

These along with additional problems and issues exist with regard to conventional database systems.

BRIEF SUMMARY

Embodiments of the present disclosure provide benefits and/or solve one or more of the foregoing or other problems in the art with systems, non-transitory computer-readable media, and methods for searching a database by linking a database schema to a natural language query. For example, in some implementations, the disclosed systems select relevant tables from a database schema for a user-defined question entered via a client device in a natural language format. To illustrate, in some embodiments, the disclosed systems receive the natural language query and compare the natural language query with individual tables within the database schema (e.g., by comparing embeddings of the natural language query with embeddings of descriptions of the tables). Based on these comparisons, in some embodiments, the disclosed systems determine a set of relevant tables for the natural language query. In some implementations, the disclosed systems utilize a machine learning model to generate a structured database query based on the natural language query and the set of relevant tables.

Additionally, in some implementations, the disclosed systems generate a schema graph connecting tables in the database schema. To illustrate, in some embodiments, the disclosed systems identify atomic tables and bridge tables within the database schema and assign corresponding nodes for the atomic tables and the bridge tables within the schema graph. More specifically, the schema graph connects the atomic tables and bridge tables via a plurality of edges according to relationships between the corresponding tables. Moreover, in some implementations, the disclosed systems utilize the schema graph to compare the natural language query with the tables of the database schema by determining atomic tables and connecting bridge tables relevant to the query. For example, in some cases, the disclosed systems augment an initial subset of relevant tables with additional tables that contain relational information about some of the relevant tables.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
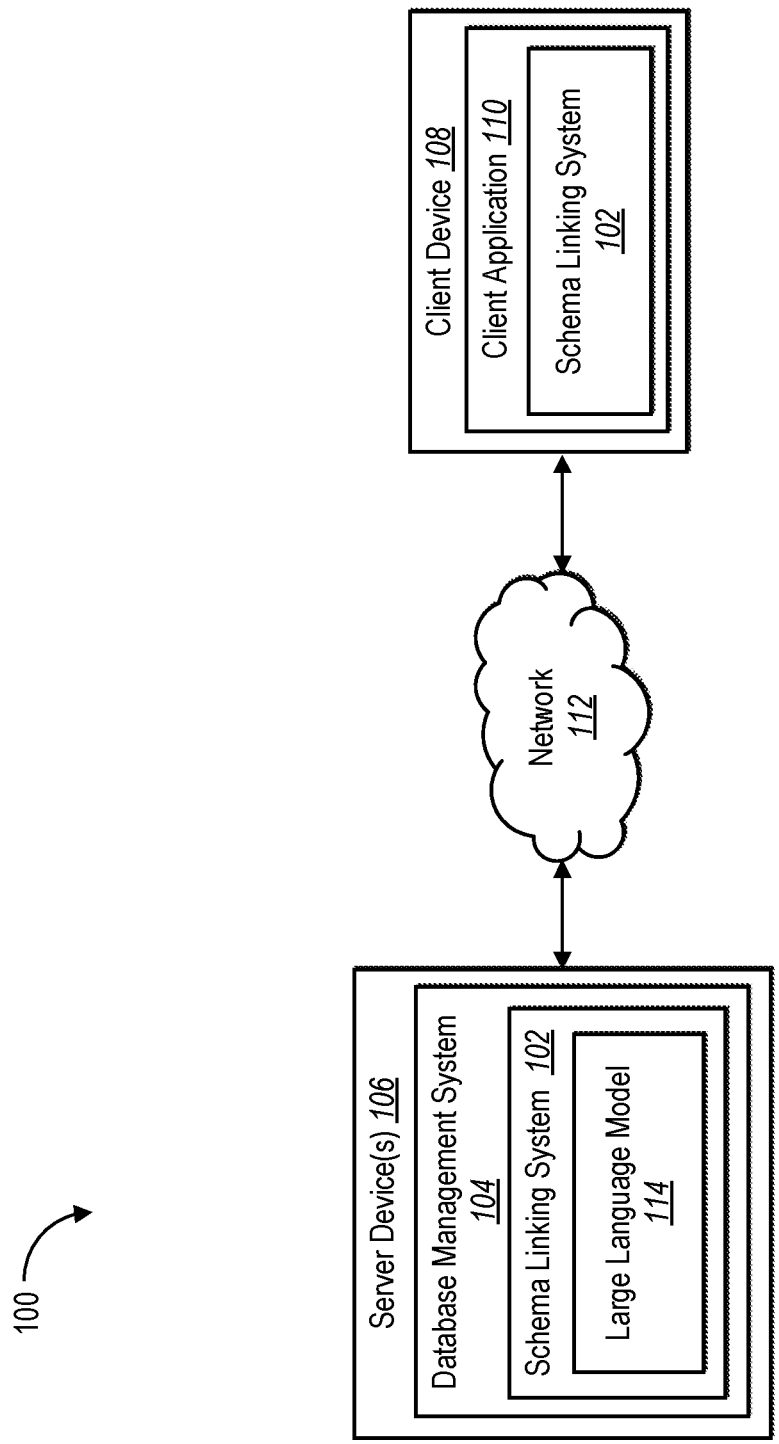
FIG. 1 illustrates a diagram of an environment in which a schema linking system operates in accordance with one or more embodiments.

This disclosure describes one or more embodiments of a schema linking system that links a database schema to a natural language query. For example, in some implementations, the schema linking system selects relevant tables from a given database schema for a question posed in a natural language format. To illustrate, in some cases, the schema linking system receives the natural language query and compares the natural language query with all individual tables within the database schema (e.g., by comparing embeddings of the natural language query with embeddings of descriptions of the tables). Based on these comparisons, the schema linking system determines a set of tables relevant to the natural language query. For example, the schema linking system utilizes a predetermined similarity threshold to identify the most relevant tables for the set. In some implementations, the schema linking system utilizes a machine learning model (e.g., a large language model) to generate a structured database query based on the natural language query and the set of relevant tables.

In addition, in some implementations, the schema linking system generates a schema graph for the database schema. To illustrate, in some embodiments, the schema linking system identifies atomic tables and bridge tables within the database schema and assigns and connects corresponding nodes for the atomic tables and bridge tables within the schema graph according to relationships between the tables in the database schema. Moreover, in some implementations, the schema linking system utilizes the schema graph to compare the natural language query with the tables of the database schema and determine the set of relevant tables. For example, the schema linking system augments an initial subset of relevant tables (e.g., relevant atomic tables) with additional tables that contain relational information about some of the relevant tables (e.g., related bridge tables).

To further illustrate, in some implementations, the schema linking system utilizes a large language model to convert a natural language query to a structured database query. To achieve this, in some embodiments, the schema linking system leverages a schema graph to determine a portion of a database schema that is most important to the natural language query. Additionally, the schema linking system utilizes the large language model with the natural language query to process only that portion of the database schema, thereby reducing the amount of data required to generate an accurate result including relevant information from the database.

The schema linking system provides a variety of technical advantages relative to conventional systems. For example, by generating a schema graph linking a database schema to a natural language query (e.g., before converting the natural language query to a structured database query), the schema linking system provides enhanced flexibility of operation relative to conventional systems. Specifically, the schema linking system enables client devices to submit a query in a natural language format, without the rigidity of structured query formats. Accordingly, the schema linking system leverages the schema graph to convert natural language queries to structured database queries that target only relevant tables in a database without requiring the initial queries to follow specific formatting requirements, thereby improving the usability of database querying systems.

Additionally, by identifying relevant schema tables for a natural language query, the schema linking system increases computational efficiency by reducing the amount of data to process through a large language model for converting the natural language query to a structured database query. In particular, the schema linking system substantially reduces the number of tables of the database schema that are processed through the large language model via the use of a schema graph. Thus, the schema linking system provides a robust solution that handles complex tasks of converting natural language queries to structured queries while improving the accuracy and focus of the resulting structured database query and reducing the burden on the large language model and the database being queried. To illustrate, the schema linking system provides database querying that limits the number of locations (e.g., tables) touched by each query by restricting searches to only relevant portions. Furthermore, by so reducing the amount of data to process through the large language model, the schema linking system allows the large language model to focus on formulating the structured database query because the relevant tables and columns are already identified. Moreover, the resulting structured database queries are more accurate (e.g., more responsive to the natural language query), thereby enhancing information retrieval from relational databases.

As illustrated by the foregoing discussion, the present disclosure utilizes a variety of terms to describe features and advantages of the schema linking system. For example, as used herein, the term "database schema" refers to an organizational structure of a database. To illustrate, a database schema is a blueprint of how data is stored within the database. For instance, a database schema includes tables and relational information about the tables.

Moreover, as used herein, the term "atomic table" refers to a table containing atomic information about an individual entity or distinguishable group/segment. For example, an atomic table contains data that is particularized for a single entity (e.g., a distinct group or segment of users). Relatedly, the term "bridge table" refers to a table that contains information about how multiple entities are interconnected. For example, a bridge table includes data that describes relationships between two or more entities corresponding to two or more atomic tables.

As used herein, the term "embedding" refers to a numerical representation of features of a component of information. For instance, an embedding includes a latent feature vector representation of a description or sentence. In some cases, an embedding is generated by one or more layers of a neural network, such as an embedding model. To illustrate, in some cases, a description embedding includes a numerical representation of a semantic description (e.g., of a table or column). In some cases, a token embedding includes a numerical representation of one or more tokens of a sentence. For example, the schema linking system tokenizes a natural language query into tokens and embeds the tokens into token embeddings.

As used herein, the term "schema graph" refers to a construction of nodes and edges that represent information in a database schema. For example, a schema graph includes a knowledge graph that has nodes corresponding to tables within the database schema and edges corresponding to relationships between the tables. In some cases, the nodes of the schema graph have attributes that represent components of a table (e.g., column names, data types, descriptions, etc.). Similarly, in some cases, the edges of the schema graph have attributes that represent relationships between tables (e.g., links from table to table).

As used herein, the term "natural language query" refers to a semantic input requesting information about a database or requesting operations to be performed on the database. For example, a natural language query includes a question or command in plain language that seeks information about data and/or tables of a database.

As used herein, the term "relevant table" refers to a table in a database schema that contains information relevant to a natural language query. For example, a relevant table includes an atomic table in the database schema that includes data necessary to or helpful to answering the natural language query. Moreover, in some embodiments, a relevant table includes a bridge table that contains relational information about other relevant tables. Accordingly, in some embodiments, a set of relevant tables includes two or more atomic tables and one or more bridge tables linking the atomic tables.

As used herein, the term "structured database query" refers to a command in a structured query format (e.g., SQL format or DDL format) that seeks information from a database or that requests performance of an operation on the database. For example, a structured database query includes a translation of a natural language query into the structured query format.

As used herein, the term "structured database query result" refers to a response to a structured database query in a structured query format (e.g., SQL format or DDL format). For example, a structured database query result is an output of an operation executing the structured database query on some or all of a database.

As used herein, the term "natural language response" refers to a semantic answer to a natural language query. For example, a natural language response includes an answer in plain language that gives information about data and/or tables of a database. In some cases, a natural language response includes a translation of a structured database query result into a natural language.

As used herein, the term "machine learning model" refers to a computer representation that is tunable (e.g., trained) based on inputs to approximate unknown functions used for generating corresponding outputs. In particular, in one or more embodiments, a machine learning model is a computer-implemented model that utilizes algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), support vector learning, Bayesian networks, a transformer-based model, a diffusion model, or a combination thereof.

Similarly, as used herein, the term "neural network" refers to a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network includes various layers such as an input layer, one or more hidden layers, and an output layer that each perform tasks for processing data. For example, a neural network includes a deep neural network, a convolutional neural network, a diffusion neural network, a recurrent neural network (e.g., an LSTM), a graph neural network, a transformer, or a generative adversarial neural network.

Relatedly, as used herein, the term "large language model" refers to a machine learning model trained to perform computer tasks to generate or identify a response to a natural language query (e.g., a structured database query) and/or a natural language response based on a structured database query result (e.g., a natural language interpretation of the structured database query result). In particular, a large language model includes a neural network (e.g., a deep neural network) with many parameters trained on large quantities of data (e.g., unlabeled text) using a particular learning technique (e.g., self-supervised learning).

Additional detail will now be provided in relation to illustrative figures portraying example embodiments and implementations of a schema linking system. For example, FIG. 1 illustrates a system 100 (or environment) in which a schema linking system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes a database management system 104 that further includes the schema linking system 102. In some embodiments, the schema linking system 102 determines tables in a database (e.g., represented by a database schema) that are relevant to a natural language query. In some embodiments, the schema linking system 102 utilizes a machine learning model (such as a large language model 114) to generate a response for the natural language query. In some embodiments, the server device(s) 106 includes, but is not limited to, a computing device (such as explained below with reference to FIG. 10).

In some instances, the schema linking system 102 receives a request (e.g., from the client device 108) to access data in a database via a natural language query. For example, the schema linking system 102 receives a natural language query for specific data corresponding to one or more tables in a database and, in response to the request, identifies relevant tables by comparing the natural language query with tables in the database according to a database schema. Some embodiments of server device(s) 106 perform a variety of functions via the database management system 104 on the server device(s) 106. To illustrate, the server device(s) 106 (through the schema linking system 102 on the database management system 104) performs functions such as, but not limited to, determining a subset of tables relevant to a natural language query, selecting additional tables defining relationships between relevant tables, appending the additional tables to the subset of relevant tables, and generating a response for the natural language query. In some embodiments, the server device(s) 106 utilizes the large language model 114 to generate the response for the natural language query. In some embodiments, the server device(s) 106 trains the large language model 114.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 10. Some embodiments of client device 108 perform a variety of functions via a client application 110 on client device 108. For example, the client device 108 (through the client application 110) performs functions such as, but not limited to, determining a subset of tables relevant to a natural language query, selecting additional tables defining relationships between relevant tables, appending the additional tables to the subset of relevant tables, and generating a response for the natural language query. In some embodiments, the client device 108 utilizes the large language model 114 to generate the response for the natural language query. In some embodiments, the client device 108 trains the large language model 114.

To access the functionalities of the schema linking system 102 (as described above and in greater detail below), in one or more embodiments, a user interacts with the client application 110 on the client device 108. For example, the client application 110 includes one or more software applications (e.g., to interact with databases in accordance with one or more embodiments described herein) installed on the client device 108, such as a database management application, a database editing application, and/or a database access application. In certain instances, the client application 110 is hosted on the server device(s) 106. Additionally, when hosted on the server device(s) 106, the client application 110 is accessed by the client device 108 through a web browser and/or another online interfacing platform and/or tool. Furthermore, in some embodiments, the client device 108, the server device(s) 106, or another system host one or more databases including digital data.

As illustrated in FIG. 1, in some embodiments, the schema linking system 102 is hosted by the client application 110 on the client device 108 (e.g., additionally or alternatively to being hosted by the database management system 104 on the server device(s) 106). For example, the schema linking system 102 performs the schema linking techniques described herein on the client device 108. In some implementations, the schema linking system 102 utilizes the server device(s) 106 to train and implement machine learning models (such as the large language model 114). In one or more embodiments, the schema linking system 102 utilizes the server device(s) 106 to train machine learning models (such as the large language model 114) and utilizes the client device 108 to implement or apply the machine learning models.

Further, although FIG. 1 illustrates the schema linking system 102 being implemented by a particular component and/or device within the system 100 (e.g., the server device(s) 106 and/or the client device 108), in some embodiments the schema linking system 102 is implemented, in whole or in part, by other computing devices and/or components in the system 100. For instance, in some embodiments, the schema linking system 102 is implemented on another client device. More specifically, in one or more embodiments, the description of (and acts performed by) the schema linking system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., a natural language query). In response, the schema linking system 102 on the server device(s) 106 performs operations described herein to determine relevant tables in a database schema for the natural language query. The server device(s) 106 provides the output or results of the operations (e.g., a list of the relevant tables, a response for the natural language query, or both) to the client device 108. As another example, in some implementations, the schema linking system 102 on the client device 108 performs operations described herein to determine relevant tables in a database schema for the natural language query. The client device 108 provides the output or results of the operations (e.g., a list of the relevant tables, a response for the natural language query, or both) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 10. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

As discussed, in some embodiments, the schema linking system 102 determines a set of relevant tables of a database for a natural language query. For instance, FIG. 2 illustrates the schema linking system 102 obtaining a natural language query and indications of tables in a database schema to determine relevant tables in accordance with one or more embodiments.

Figure 2:
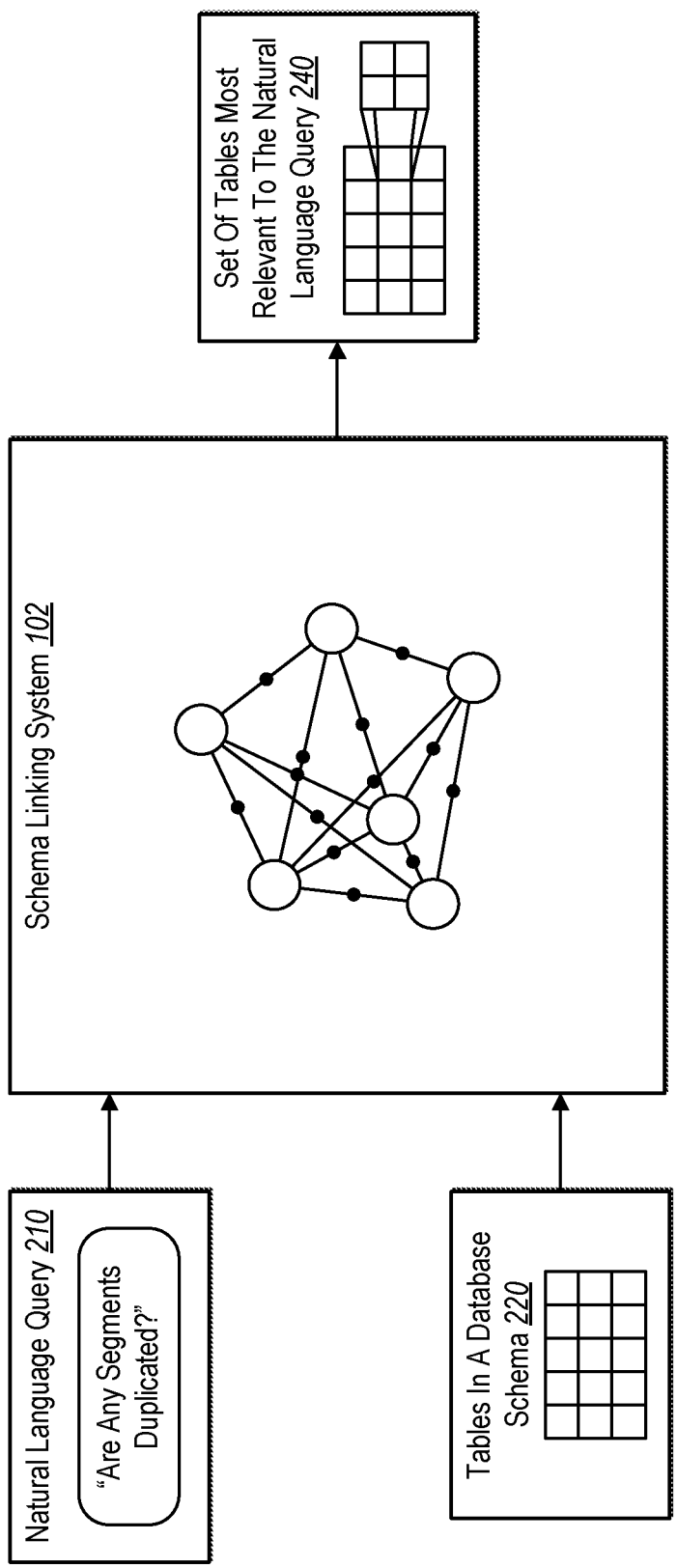
FIG. 2 illustrates the schema linking system obtaining a natural language query and tables in a database schema to determine relevant tables for the natural language query in accordance with one or more embodiments.

In particular, FIG. 2 shows the schema linking system 102 obtaining a natural language query 210. For instance, the schema linking system 102 receives, from a client device, an input containing the natural language query 210. In some cases, the natural language query 210 is (or includes) one or more plain language sentences or phrases (e.g., a question, a command, etc.) seeking information about data stored in the database. As an example, a natural language query 210 includes a request to determine whether a database includes duplicate entries for a particular segment.

In addition, FIG. 2 shows the schema linking system 102 obtaining tables in a database schema 220. For instance, the schema linking system 102 looks up some or all of the tables defined by a schema of the database. In some implementations, the schema linking system 102 utilizes multiple schemas (e.g., several or all schemas of the database) and looks up tables across the multiple schemas.

As further shown in FIG. 2, the schema linking system 102 utilizes the tables in the database schema 220 with the natural language query 210 to identify which tables in the schema(s) are most relevant to answering the natural language query 210 (e.g., via a schema graph). For example, and as described in additional detail below, the schema linking system 102 compares token embeddings of the natural language query 210 with description embeddings of individual tables to determine which tables are most closely related to the natural language query 210. More particularly, the schema linking system 102 determines a set of tables 240 most relevant to the natural language query 210. Additionally, in some cases, the schema linking system 102 adds—to the set of relevant tables—additional tables that define relational information about the relevant tables. In some implementations, upon determining the tables relevant to the natural language query 210, the schema linking system 102 utilizes a large language model (e.g., large language model 114) to generate a response for the natural language query 210 based on the relevant tables.

As mentioned, in some embodiments, the schema linking system 102 generates a schema graph representing tables of a database and their relationships in a database schema. For instance, FIG. 3 illustrates the schema linking system 102 analyzing tables of a database schema to generate a schema graph in accordance with one or more embodiments.

Figure 3:
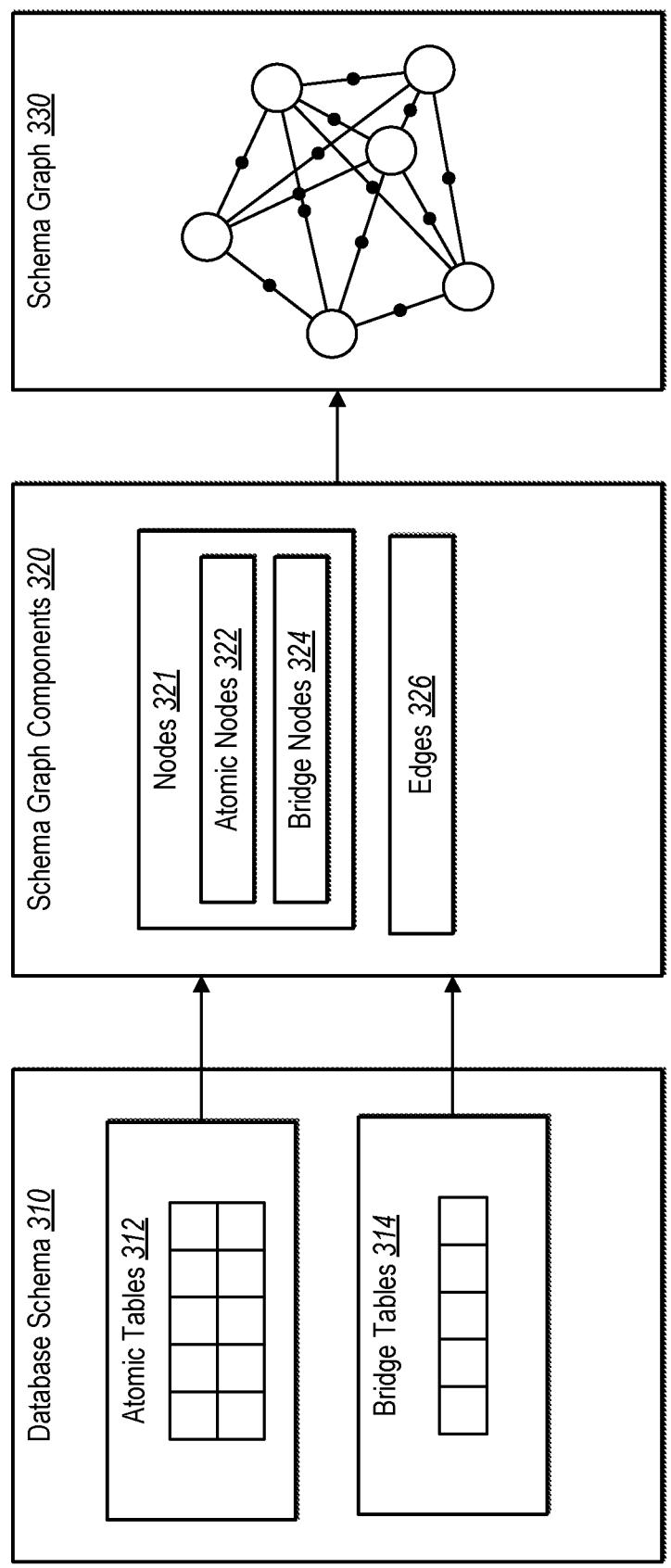
FIG. 3 illustrates the schema linking system analyzing tables of a database schema to generate a schema graph in accordance with one or more embodiments.

Specifically, FIG. 3 shows the schema linking system 102 determining atomic tables 312 and bridge tables 314 within a database schema 310. In some embodiments, the atomic tables 312 include individualized information for entities represented in the database schema 310. For instance, an atomic table 312 contains information about a single entity, such as attributes or other data describing the entity. Relatedly, in some embodiments, the bridge tables 314 include relational information for a connection between two (or more) atomic tables 312. For example, a bridge table 314 contains information about how two atomic tables 312 are connected (e.g., how entities corresponding to the atomic tables are related).

Moreover, FIG. 3 shows the schema linking system 102 generating schema graph components 320 from the atomic tables 312 and the bridge tables 314. To illustrate, the schema linking system 102 generates nodes 321 and edges 326, with which the schema linking system 102 generates a schema graph 330 for the database schema 310. In particular, in some implementations, the schema linking system 102 assigns a node 321 within the schema graph 330 to each atomic table of the atomic tables 312 within the database schema 310. For example, the schema linking system 102 generates atomic nodes 322 from the atomic tables 312. The atomic nodes 322 include various information about the atomic tables 312, such as column names, data types, and/or descriptions. The schema linking system 102 stores this information as attributes of the atomic nodes 322.

Similarly, in some implementations, the schema linking system 102 assigns a node 321 within the schema graph 330 to each bridge table of the bridge tables 314 within the database schema 310. For example, the schema linking system 102 generates bridge nodes 324 to represent the bridge tables 314. For instance, the schema linking system 102 adds an additional node 321 within the schema graph 330 between a pair of nodes representing atomic tables 312 for each bridge table of the bridge tables 314 within the database schema 310.

As just mentioned, in some embodiments, the schema linking system 102 generates edges 326 as part of the schema graph 330. For instance, the schema linking system 102 generates a first edge 326 between a bridge node 324 and a first atomic node 322, and a second edge 326 between the bridge node 324 and a second atomic node 322. The first edge represents relational information for the bridge table 314 corresponding with the bridge node 324 and a first atomic table 312 corresponding with the first atomic node 322. The second edge represents relational information for the bridge table 314 corresponding with the bridge node 324 and a second atomic table 312 corresponding with the second atomic node 322. Furthermore, in some embodiments, the schema linking system 102 incorporates the bridge nodes 324 with the atomic nodes 322 into the schema graph 330 via the edges 326 based on foreign key relationships originating from the bridge tables 314.

In some embodiments, the schema linking system 102 generates the schema graph 330 in advance of determining relevant tables for a natural language query. For example, the schema linking system 102 generates the schema graph 330 for the database schema 310 one time for future use. Moreover, in some cases, the schema linking system 102 updates the schema graph 330 as changes are made to the database schema 310.

Alternatively, in some implementations, the schema linking system 102 generates the schema graph 330 in real time. For instance, in some embodiments, the schema linking system 102 generates a schema graph in response to receiving a natural language query. For example, in some cases, in response to receiving the natural language query, the schema linking system 102 determines relevant schema tables by generating the schema graph and utilizing the schema graph to examine relationships between the natural language query and the tables of the database schema.

As discussed, in some embodiments, the schema linking system 102 determines relevant tables of a database schema for a natural language query. For instance, FIG. 4 illustrates the schema linking system 102 obtaining a natural language query and evaluating tables in a database schema to determine a set of relevant tables in accordance with one or more embodiments.

Figure 4:
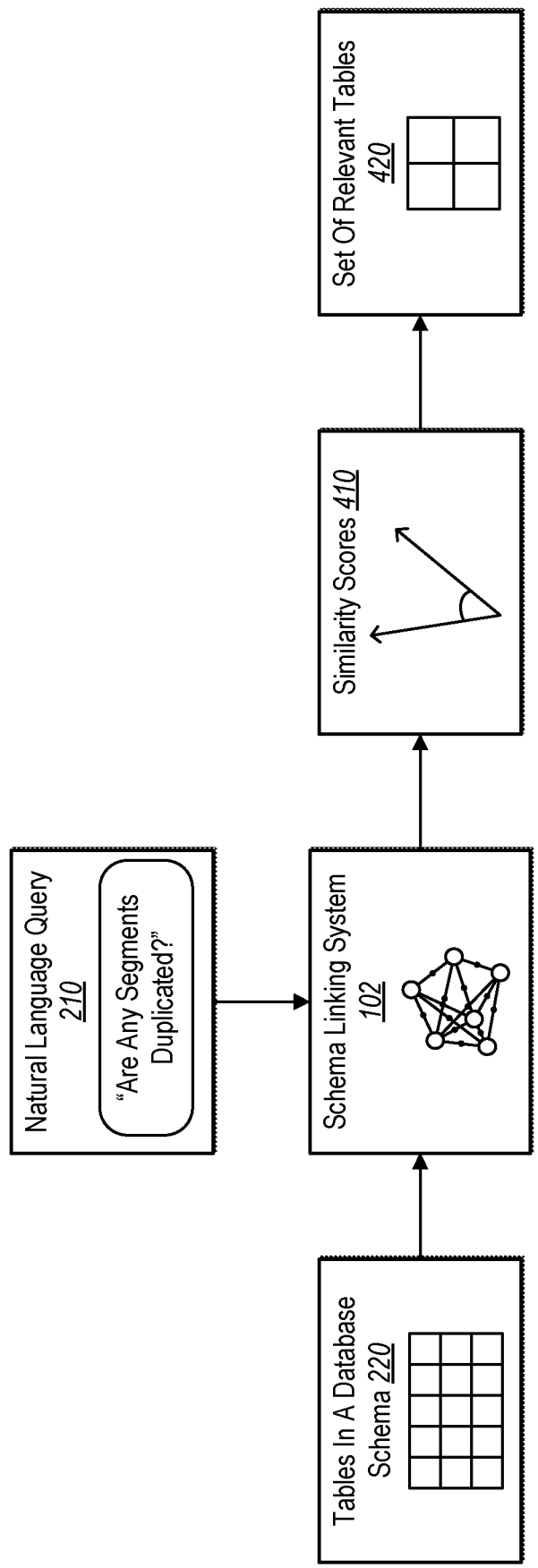
FIG. 4 illustrates the schema linking system obtaining a natural language query and evaluating tables in a database schema to determine a set of relevant tables in accordance with one or more embodiments.

In particular, FIG. 4 shows the schema linking system 102 receiving the natural language query 210 and comparing the natural language query 210 with the tables in a database schema 220. For example, the schema linking system 102 determines, from the tables in the database schema 220, a set of relevant tables 420 including a subset of tables in the database schema 220 that are relevant to the natural language query 210 by comparing description embeddings for the tables in the database schema 220 and token embeddings for the natural language query 210.

To illustrate, in some cases, the schema linking system 102 determines the set of relevant tables 420 by first generating the description embeddings and the token embeddings, and then comparing the description embeddings and the token embeddings. For example, the schema linking system 102 generates the description embeddings for the tables in the database schema 220 by processing textual descriptions of the tables in the database schema 220 through an embedding model. Additionally, in some embodiments, the schema linking system 102 generates tokens of the natural language query 210 by processing the natural language query 210 through a tokenizer. Moreover, in some implementations, the schema linking system 102 generates the token embeddings for the natural language query 210 by processing the tokens of the natural language query 210 through the embedding model. In some cases, a description for a table is unavailable. In these cases, to generate a description embedding, the schema linking system 102 first generates a textual description using the table name and column names from the table.

As mentioned, in some implementations, the schema linking system 102 compares the natural language query 210 with the tables in the database schema 220. More particularly, in some implementations, the schema linking system 102 determines similarity scores 410 for the natural language query 210 and the tables in the database schema 220. For example, the schema linking system 102 determines similarity scores 410 that represent measures of closeness (e.g., distances in a latent vector space) between the natural language query 210 and the tables 220. For instance, the schema linking system 102 determines similarity scores 410 between the token embeddings for the natural language query 210 and the description embeddings for the tables in the database schema 220. In some embodiments, the schema linking system 102 utilizes a cosine similarity metric for the similarity scores 410. Alternatively, in some cases, the schema linking system 102 determines the similarity scores 410 utilizing a correlation metric, a Minkowski distance (e.g., a Euclidean distance, a Manhattan distance, a Chebyshev distance), a Canberra distance, a Hamming distance, or some other similarity metric.

In some implementations, the schema linking system 102 determines the set of relevant tables 420 relevant to the natural language query 210 from a schema graph for the database schema. For example, the schema linking system 102 determines the set of relevant tables 420 for the natural language query 210 by comparing nodes of the schema graph (e.g., schema graph 330) and token embeddings for the natural language query 210. For instance, the schema linking system 102 determines the similarity scores 410 between description embeddings for atomic tables in the database schema (e.g., represented by atomic nodes in the schema graph) and the token embeddings for the natural language query 210.

As mentioned, in some embodiments, the schema linking system 102 appends a set of relevant tables (e.g., an initial subset of relevant tables) with additional tables related to the relevant tables. For instance, FIG. 5 illustrates the schema linking system 102 selecting an additional table between relevant tables in accordance with one or more embodiments.

Figure 5:
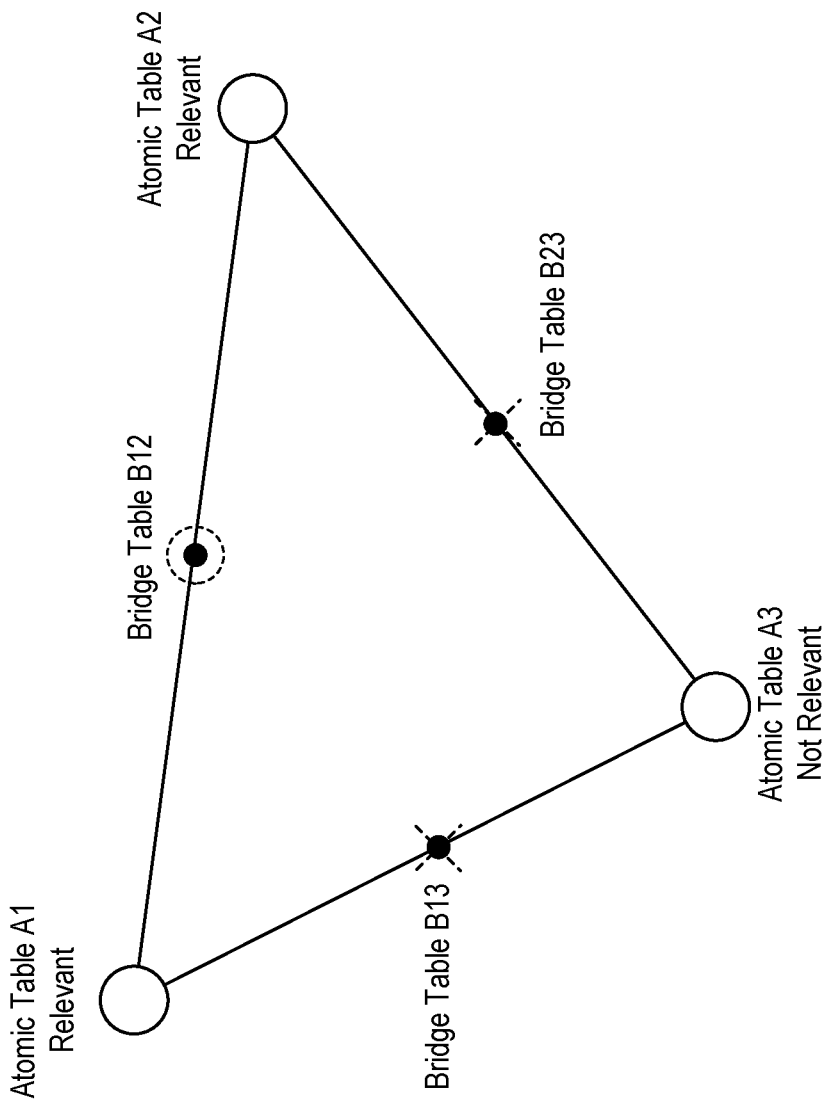
FIG. 5 illustrates the schema linking system selecting an additional table between relevant tables in accordance with one or more embodiments.

Specifically, FIG. 5 shows nodes and edges of a schema graph. In particular, FIG. 5 shows atomic nodes representing atomic tables (e.g., atomic tables A1, A2, and A3). Additionally, bridge nodes and edges connect the atomic tables (e.g., bridge tables B12, B13, and B23). As discussed above, in some implementations, the schema linking system 102 generates the schema graph based on tables of a database schema representing a database.

As also shown in FIG. 5, the schema linking system 102 determines that atomic tables A1 and A2 are relevant to a natural language query, while atomic table A3 is not relevant to the natural language query. In some implementations, the schema linking system 102 selects an additional table (e.g., bridge table B12) along a path between a pair of nodes representing a pair of tables (e.g., atomic tables A1 and A2) from the subset of tables relevant to the natural language query. To further illustrate, in some embodiments, the schema linking system 102 determines multiple additional tables along paths between pairs of nodes representing relevant tables.

In some cases, the schema linking system 102 selects the additional table by determining a shortest path between the pair of nodes and determining an additional node on the shortest path. In particular, the additional node represents a bridge table comprising relational information for the pair of tables represented by the pair of nodes. To illustrate, in some implementations, the schema linking system 102 utilizes dynamic programming to determine the shortest path between nodes. In some implementations, the schema linking system 102 utilizes Dijkstra's algorithm to determine the shortest path.

Moreover, in some embodiments, the schema linking system 102 includes the additional table(s) with the subset of relevant tables to further determine a set of relevant tables. In some cases, the bridge tables that connect relevant atomic tables are likely to also include information relevant to the natural language query. To further illustrate, in some implementations, the schema linking system 102 determines a set of relevant tables by appending the additional table(s) to the subset of tables relevant to the natural language query. In additional embodiments, the schema linking system 102 also adds one or more atomic tables in a path between two relevant atomic tables in addition to any bridge tables connecting the two relevant atomic tables and the additional atomic table(s) along the path.

The techniques of the schema linking system 102 generating the schema graph 330 is represented symbolically in the form of algorithms, as given below.

---
Algorithm 1 Atomic table selector
---

Require: q, T, θ {q refers to the query token embedding, T refers to the list of atomic table descriptions, θ is the threshold} {Initializing the similarity score set}
1.   table = None
2.   for t ∈ T do
3.      τ = cos_sim(q, t) {calculating the cosine similarity between the token embedding and the table description embeddings}
4.      if τ > θ then
5.         table = t
6.         break
7.      end if
8.   end for
9.   return table

---

In some implementations, the schema linking system 102 utilizes Algorithm 1 above to determine atomic tables that are relevant to the natural language query. In Algorithm 1, q represents a token from the tokenized form of the natural language query, T represents the collection of embeddings of all the atomic table descriptions present in the database, and θ represents a predefined similarity threshold.

For the given token embeddings, the schema linking system 102 compares the embeddings of all the atomic table descriptions present in the database. The schema linking system 102 computes the similarity score between the query token and each table's embeddings. The score quantifies the similarity between the token and the table in terms of the semantic meaning. The schema linking system 102 considers a table as relevant if its similarity score with the query token exceeds the predefined threshold (θ). In some implementations, the predefined threshold is set such that a small number of tables are selected for inclusion in the subset of relevant atomic tables.

By utilizing Algorithm 1, the schema linking system 102 efficiently determines the most relevant tables for each token from a given natural language query, thereby contributing to the enhanced accuracy and effectiveness provided by the schema linking system 102.

---
Algorithm 2 Schema graph
---

Require: S {S refers to the database schema}
1.   G = graph( )
2.   A = S.atomic_tables
3.   for n ∈ A do
4.      G.add_node(n)
5.   end for
6.   B = S.bridge_tables
7.   for b ∈ B do
8.      G.add_node(b) {each bridge table is associated with two tables referred to here as α and β, where α, β ∈ atomic_tables}
9.      G.add_edge(α, b)
10.     G.add_edge(β, b)
11.   end for
12.  return G

---

In some implementations, the schema linking system 102 utilizes Algorithm 2 above to generate a schema graph, which serves as a comprehensive representation of the database schema. As represented, the schema linking system 102 adds atomic tables to the schema graph as nodes. In some cases, the schema linking system 102 adds each atomic table as a node, and stores the description of the table as an attribute of the node. Thus, the schema linking system 102 constructs a schema graph that represents all individual entities.

Additionally, the schema linking system 102 adds bridge tables to the schema graph as nodes. In some cases, the schema linking system 102 adds each bridge table as a node, and stores information about how two atomic tables are connected as an attribute of the node.

Moreover, the schema linking system 102 creates edges to connect a bridge table with both atomic tables that the bridge table is related to. The edges represent the relationships between the bridge table and the corresponding atomic tables.

Following Algorithm 2, the schema linking system 102 constructs a complete schema graph that encompasses atomic tables and bridge tables, along with their interconnections. The schema graph provides a powerful and dynamic structure, enabling efficient navigation of the database schema and facilitating schema linking during the pipeline of converting a natural language query to a structured database query. By including bridge tables and their connections with atomic tables, the schema linking system 102 helps ensure that the schema graph captures the full complexity and relationships within the database schema, enhancing the overall effectiveness and accuracy of the schema linking process.

| Algorithm 3 Schema linker |
| --- |
| Require: Q, S {Q refers to the user's natural language query, S refers to the database schema} |
| 1.            G = schema graph (S) |
| 2.            T = embedding(S.atomic_tables) |
| 3.            Tokens = tokenizer(Q) |
| 4.            remove stop words from tokens |
| 5.            R = set( ) |
| 6.            for i ∈ token do |
| 7.              q = embedding(i) |
| 8.              R.append(Atomic table selector (q,T,θ)) |
| 9.            end for |
| 10.           final set = R |
| 11.           for (α, β) ∈ R do |
| 12.             final set.append(shortest path (α, β,G)) |
| 13.           end for |
| 14.           return final set |

In some implementations, the schema linking system 102 utilizes Algorithm 3 above to determine a full set of relevant tables in the database schema for the natural language query. As represented, the schema linking system 102 generates the schema graph (e.g., utilizing Algorithm 2). In some cases, the schema linking system 102 generates the schema graph before receiving the natural language query. Alternatively, in some cases, the schema linking system 102 generates the schema graph in response to receiving the natural language query (e.g., in real time).

Additionally, in some implementations, the schema linking system 102 calculates embeddings of the descriptions of atomic tables. Moreover, in some implementations, the schema linking system 102 tokenizes the natural language query, thereby breaking the natural language query into individual elements for processing. In some cases, the schema linking system 102 removes stop words from the natural language query when tokenizing. The schema linking system 102 calculates token embeddings for the remaining tokens and determines a subset of relevant atomic tables (e.g., utilizing Algorithm 1).

Furthermore, in some embodiments, the schema linking system 102 determines a shortest path between each pair of relevant atomic tables. The schema linking system 102 identifies the nodes (e.g., representing bridge tables or additional atomic tables between two relevant atomic tables) along the shortest paths, and appends the corresponding tables to the subset of relevant tables, thereby determining a full set of relevant tables for the natural language query. By including the tables represented by nodes along the shortest paths, the schema linking system 102 enhances the robustness and flexibility of the schema linking technique by increasing the completeness and accuracy of the information utilized by the large language model to convert the natural language query to a structured query result.

As discussed, in some embodiments, the schema linking system 102 generates a response for a natural language query. For instance, FIG. 6 illustrates the schema linking system 102 generating a response for a natural language query utilizing a large language model in accordance with one or more embodiments.

Figure 6:
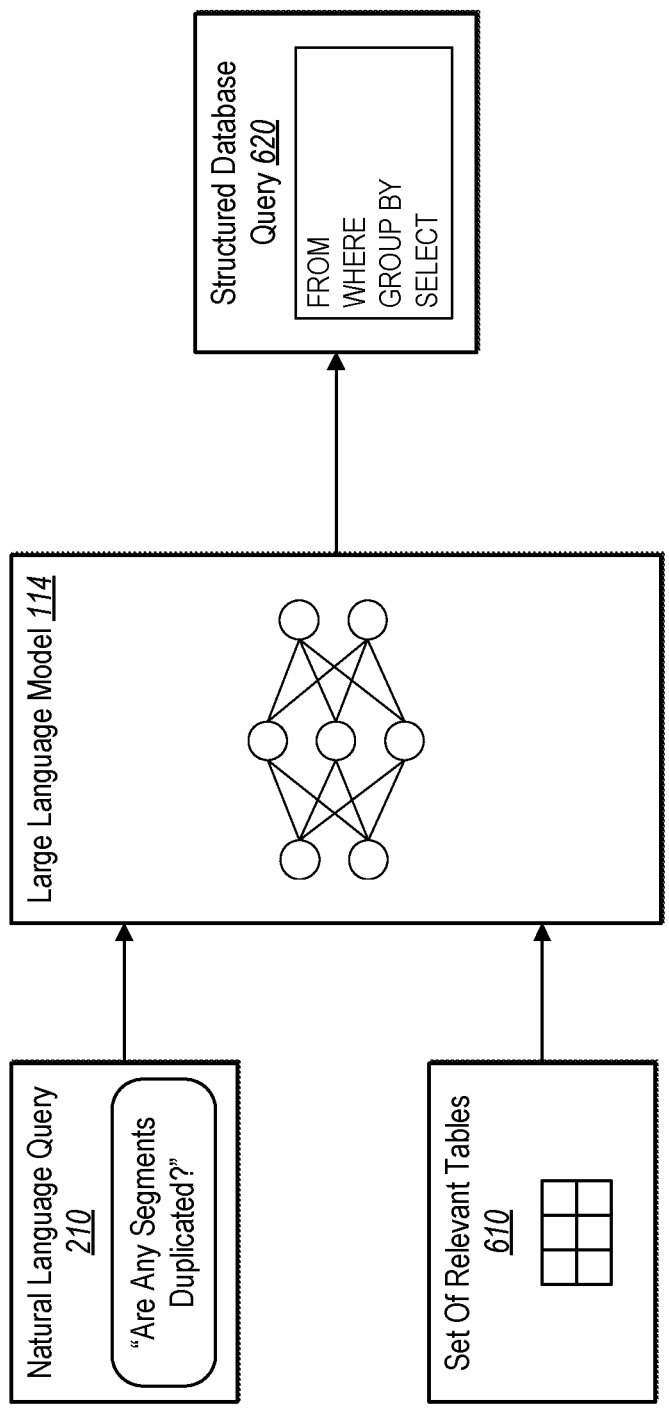
FIG. 6 illustrates the schema linking system generating a response for a natural language query utilizing a large language model in accordance with one or more embodiments.

Specifically, FIG. 6 shows the schema linking system 102 processing the natural language query 210 through a large language model (e.g., the large language model 114) to generate a structured database query 620. Additionally, FIG. 6 shows the schema linking system 102 processing a set of relevant tables 610 through the large language model to generate the structured database query 620. For example, the set of relevant tables 610 includes the set of relevant tables 420 of FIG. 4 with the additional tables(s) (e.g., bridge tables) appended to the set of relevant tables 420. To elaborate, in some implementations, the schema linking system 102 generates the response for the natural language query by generating the structured database query 620 for the natural language query by processing the natural language query 210 and the set of relevant tables 610 through the large language model 114. In particular, the schema linking system 102 processes the natural language query 210 with the set of relevant tables 610 through the large language model 114 by providing the natural language query 210 and the set of relevant tables 610 (or text representations of the set of relevant tables 610) as one or more prompts or inputs to the large language model 114.

As mentioned, in some embodiments, the schema linking system 102 generates a natural language response for a natural language query to query one or more tables in a database. For instance, FIG. 7 illustrates the schema linking system 102 utilizing a structured database query to determine a structured database query result and a natural language response in accordance with one or more embodiments.

Figure 7:
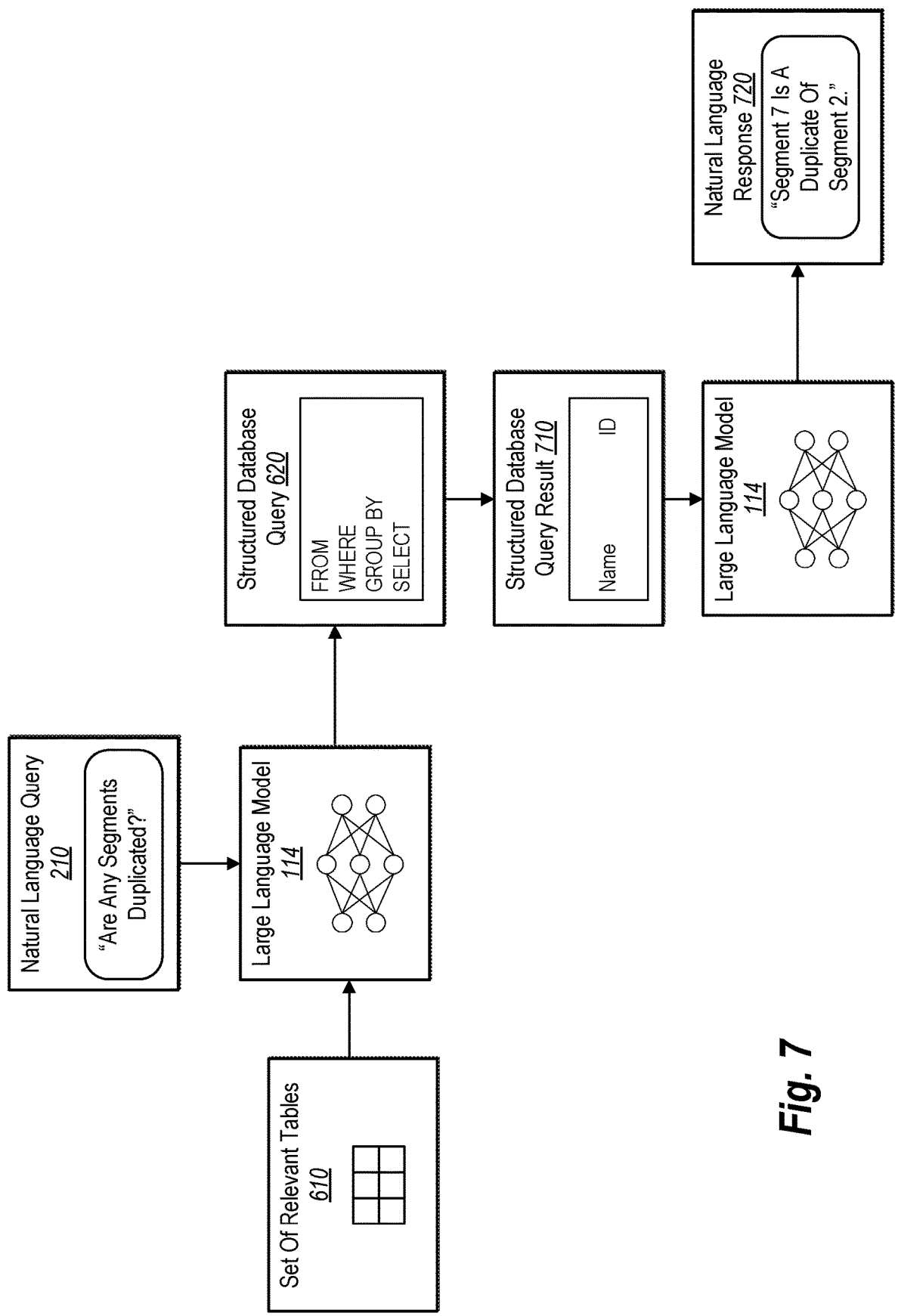
FIG. 7 illustrates the schema linking system utilizing a structured database query to determine a structured database query result and a natural language response in accordance with one or more embodiments.

Specifically, FIG. 7 shows the schema linking system 102 generating, from the set of relevant tables 610 and the natural language query 210, the structured database query 620 utilizing the large language model 114 (e.g., as shown and described for FIG. 6). Furthermore, FIG. 7 shows the schema linking system 102 executing the structured database query 620 to determine a structured database query result 710. For example, the schema linking system 102 applies the structured database query 620 (e.g., an SQL query) to the set of relevant tables in the database schema to determine an answer to the structured database query 620.

Moreover, in some embodiments, the schema linking system 102 processes the structured database query result 710 through the large language model 114 to generate a natural language response 720 for the natural language query 210. To illustrate, the schema linking system 102 enters the structured database query result 710 as a prompt to the large language model 114 to receive an output in plain language (from the large language model 114) answering the natural language query 210.

Experiments were conducted utilizing the schema linking system 102. In one experiment, the schema linking system 102 determined structured database queries for 402 natural language queries in a benchmark dataset. The results were compared with conventional SQL queries. The following table shows sample natural language queries and conventional SQL queries.

| Benchmark - Questions | Conventional SQL Query |
|---|---|
| Are there any segments that have been flagged as duplicates? | SELECT segmentId, name, pqlText FROM hkg_dim_segment WHERE pqlText IN (SELECT pqlText FROM hkg_dim_segment GROUP BY pqlText HAVING COUNT(*) >1); |
| Can you provide the count of activated segments for each destination? | SELECT count(*), t2.name as flow_name from hkg_br_flow_segment t1 join hkg_dim_flow t2 on t1.flowid = t2.flowid group by t2.name; |

The schema linking system 102 considered fifteen tables in a database schema to answer the questions in the benchmark dataset. The schema linking system 102 achieved a recall score of 100% on the benchmark dataset, which means that the schema linking system 102 selected all of the required tables for each question. The performance of the schema linking system 102 was evaluated against the diverse set of natural language queries in the benchmark dataset. The results validate the effectiveness and robustness of the schema linking system 102, demonstrating its capability to handle complex queries and large-scale database schemas. The following table shows sample inputs and outputs in the test on the benchmark dataset, in addition to showing that the schema linking system 102 reduces resource requirements by executing database queries on a subset of tables in a database based on their determined relevance.

Figure 8:
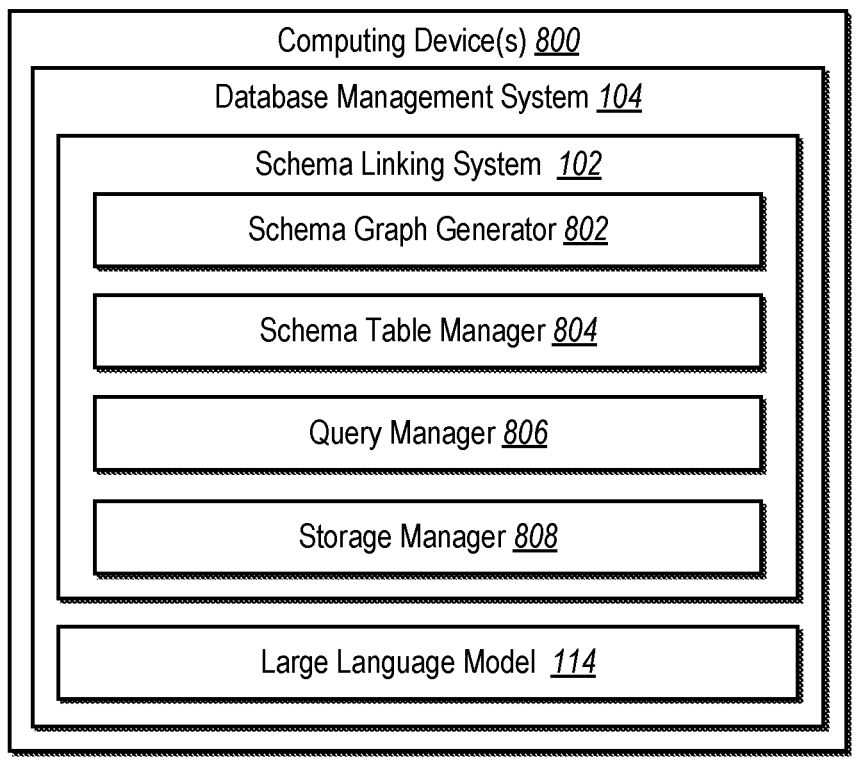
FIG. 8 illustrates a diagram of an example architecture of the schema linking system in accordance with one or more embodiments.

In addition, as shown in FIG. 8, the schema linking system 102 includes a schema table manager 804. In some implementations, the schema table manager 804 determines a subset of tables within a database schema that are relevant to a natural language query. Additionally, in some implementations, the schema table manager 804 selects additional tables that represent relational information between relevant tables, and adds the additional tables to the subset of tables to determine a full set of relevant tables.

Moreover, as shown in FIG. 8, the schema linking system 102 includes a query manager 806. In some implementations, the query manager 806 receives a natural language query and generates a response for the natural language query. For instance, the query manager 806 utilizes the set of relevant tables to determine a structured database query that represents the natural language query. In some implementations, the query manager utilizes a large language model, such as the large language model 114, to generate the response for the natural language query.

Furthermore, as shown in FIG. 8, the schema linking system 102 includes a storage manager 808. In some implementations, the storage manager 808 stores information (e.g., via one or more memory devices) on behalf of the schema linking system 102. For example, the storage manager 808 includes one or more tables of a database schema, schema graphs, natural language queries, structured database queries, structured database query results, and/or natural language responses. Additionally, in some implementations, the storage manager 808 stores parameters of one or more machine learning models, including the large language model 114.

| Benchmark - Question | Required Tables | Predicted List of Tables | Fraction of Selected Tables |
|---|---|---|---|
| Are there any segments that have been flagged as duplicates? | ['hkg_dim_segment'] | {'hkg_dim_segment', 'hkg_br_flow_segment', 'hkg_dim_flow'} | 3/15 = 20% |
| Can you provide the count of activated segments for each destination? | ['hkg_br_flow_segment', 'hkg_dim_flow'] | {'hkg_br_dataset_attribute', 'hkg_dim_dataset', 'hkg_br_flow_segment', 'hkg_dim_flow', 'hkg_br_flow_target', 'hkg_dim_segment', 'hkg_br_segment_attribute', 'hkg_dim_attribute', 'hkg_dim_target_connection'} | 9/15 = 60% |

Turning now to FIG. 8, additional detail will be provided regarding components and capabilities of one or more embodiments of the schema linking system 102. In particular, FIG. 8 illustrates an example schema linking system 102 executed by a computing device(s) 800 (e.g., the server device(s) 106 or the client device 108). As shown by the embodiment of FIG. 8, the computing device(s) 800 includes or hosts the database management system 104, the schema linking system 102, and the large language model 114. Furthermore, as shown by the embodiment of FIG. 8, the schema linking system 102 includes a schema graph generator 802, a schema table manager 804, a query manager 806, and a storage manager 808.

As shown in FIG. 8, the schema linking system 102 includes a schema graph generator 802. In some implementations, the schema graph generator 802 generates a schema graph for a database schema. For example, the schema graph generator 802 determines atomic tables and bridge tables in a database schema, and assigns corresponding nodes for the tables in the schema graph.

Each of the components 802-808 of the schema linking system 102 can include software, hardware, or both. For example, the components 802-808 can include one or more instructions stored on a computer-readable storage medium and executable by processors of one or more computing devices, such as a client device or server device. When executed by the one or more processors, the computer-executable instructions of the schema linking system 102 can cause the computing device(s) to perform the methods described herein. Alternatively, the components 802-808 can include hardware, such as a special purpose processing device to perform a certain function or group of functions. Alternatively, the components 802-808 of the schema linking system 102 can include a combination of computer-executable instructions and hardware.

Furthermore, the components 802-808 of the schema linking system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-808 may be implemented as a stand-alone application, such as a desktop or mobile application. Furthermore, the components 802-808 may be implemented as one or more web-based applications hosted on a remote server. The components 802-808 may also be implemented in a suite of mobile device applications or "apps." To illustrate, the components 802-808 may be implemented in an application, including but not limited to ADOBE® EXPERIENCE CLOUD®, ADOBE® EXPERIENCE PLATFORM, and ADOBE® CAMPAIGN.

Figure 9:
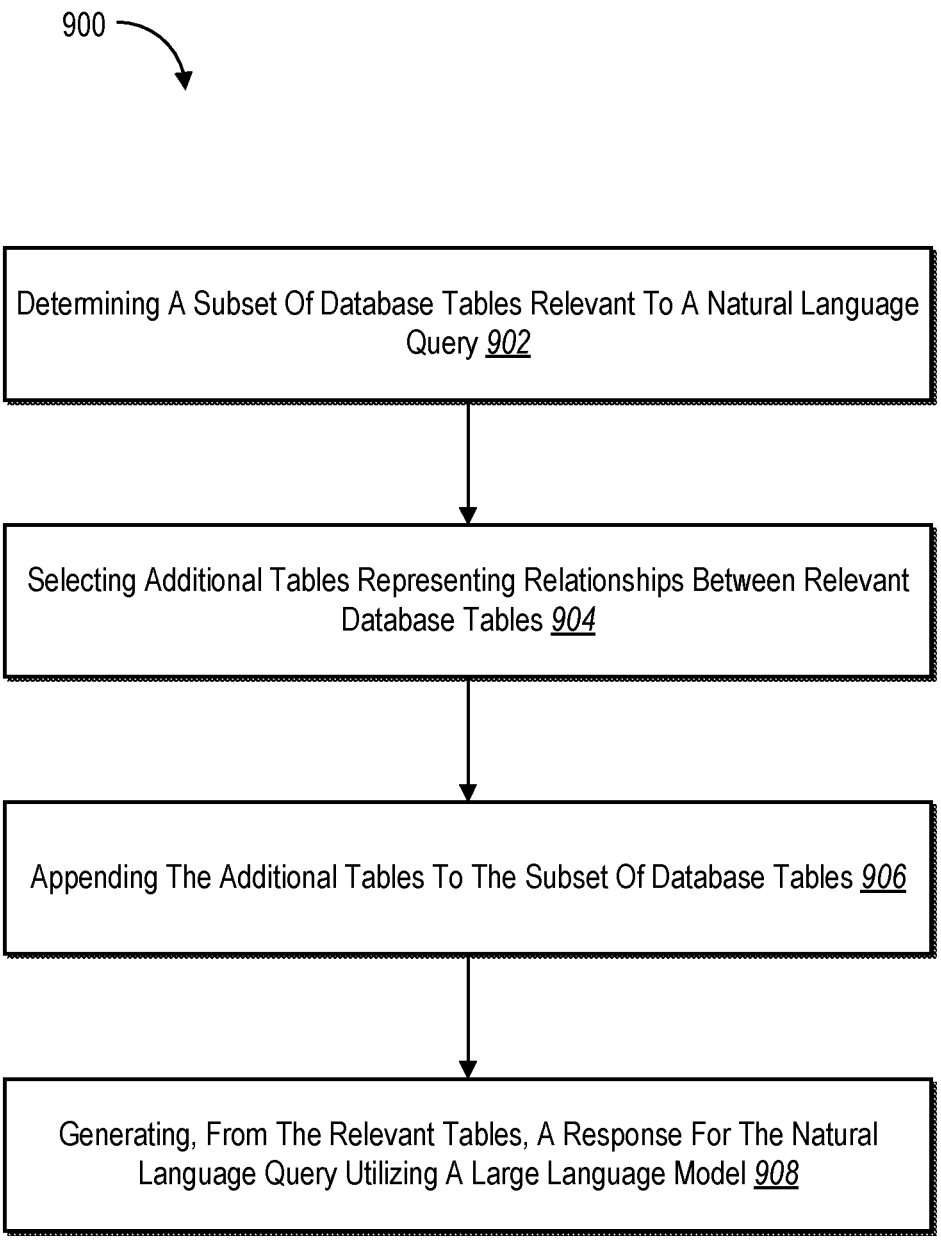
FIG. 9 illustrates a flowchart of a series of acts for linking a database schema to a natural language query in accordance with one or more embodiments.

FIGS. 1-8, the corresponding text, and the examples provide a number of different methods, systems, devices, and non-transitory computer-readable media of the schema linking system 102. In addition to the foregoing, one or more embodiments can also be described in terms of flowcharts comprising acts for accomplishing a particular result, as shown in FIG. 9. FIG. 9 may be performed with more or fewer acts. Further, the acts may be performed in differing orders. Additionally, the acts described herein may be repeated or performed in parallel with one another or parallel with different instances of the same or similar acts.

As mentioned, FIG. 9 illustrates a flowchart of a series of acts 900 for linking a database schema to a natural language query in accordance with one or more implementations. While FIG. 9 illustrates acts according to one implementation, alternative implementations may omit, add to, reorder, and/or modify any of the acts shown in FIG. 9. The acts of FIG. 9 can be performed as part of a method. Alternatively, a non-transitory computer-readable storage medium can comprise instructions that, when executed by one or more processors, cause a computing device to perform the acts of FIG. 9. In some implementations, a system performs the acts of FIG. 9.

As shown in FIG. 9, the series of acts 900 includes an act 902 of determining a subset of database tables relevant to a natural language query, an act 904 of selecting additional tables representing relationships between relevant database tables, an act 906 of appending the additional tables to the subset of database tables, and an act 908 of generating, from the relevant tables, a response for the natural language query utilizing a large language model.

In particular, in some implementations, the act 902 includes determining, from tables in a database schema, a subset of tables relevant to a natural language query by comparing description embeddings for the tables in the database schema and token embeddings for the natural language query, the act 904 includes selecting, from a schema graph comprising nodes that represent the tables in the database schema, at least one additional table along a path between a pair of nodes representing a pair of tables from the subset of tables relevant to the natural language query, the act 906 includes determining a set of relevant tables by appending the at least one additional table to the subset of tables relevant to the natural language query, and the act 908 includes generating, from the set of relevant tables, a response for the natural language query utilizing a large language model.

Moreover, in some implementations, the series of acts 900 includes generating a schema graph for a database schema, the schema graph comprising nodes that represent a plurality of atomic tables comprising individualized information for an entity represented in the database schema and one or more bridge tables comprising relational information connecting two or more atomic tables of the plurality of atomic tables; determining, from the schema graph for the database schema, a set of tables relevant to a natural language query by comparing nodes of the schema graph and token embeddings for the natural language query; and generating, from the set of tables, a response for the natural language query utilizing a large language model.

Furthermore, in some implementations, the series of acts 900 includes generating a schema graph for a database schema, the schema graph comprising nodes that represent tables in the database schema; determining, from the schema graph for the database schema, a subset of tables relevant to a natural language query by comparing nodes of the schema graph and token embeddings for the natural language query; selecting, from the schema graph for the database schema, at least one additional table along a path between a pair of nodes representing a pair of tables from the subset of tables relevant to the natural language query; and generating, from a set of tables comprising the subset of tables and the at least one additional table, a response for the natural language query utilizing a large language model.

In addition, in some implementations, the series of acts 900 includes generating the schema graph by: determining atomic tables within the database schema, the atomic tables comprising individualized information for entities represented in the database schema; and assigning a node within the schema graph to each atomic table of the atomic tables within the database schema. Alternatively, in some implementations, the series of acts 900 includes generating the schema graph for the database schema by: determining the plurality of atomic tables from the database schema; and generating a plurality of nodes within the schema graph, each node of the plurality of nodes representing a corresponding atomic table of the plurality of atomic tables within the database schema.

Moreover, in some implementations, the series of acts 900 includes generating the schema graph further by: determining bridge tables within the database schema, the bridge tables comprising relational information for a connection between two atomic tables; and adding, for each bridge table of the bridge tables within the database schema, an additional node within the schema graph between a pair of nodes representing atomic tables. Alternatively, in some implementations, the series of acts 900 includes generating the schema graph for the database schema further by: determining the one or more bridge tables from the database schema; and generating, for each bridge table of the one or more bridge tables within the database schema, an additional node within the schema graph between a pair of nodes of the plurality of nodes.

Furthermore, in some implementations, the series of acts 900 includes generating the schema graph further by: for each additional node within the schema graph, generating a first edge between the additional node and a first atomic node of the pair of nodes and a second edge between the additional node and a second atomic node of the pair of nodes, wherein the first edge and the second edge represent relational information for a bridge table and corresponding atomic tables. Alternatively, in some implementations, the series of acts 900 includes generating the schema graph for the database schema further by: generating, for each additional node corresponding with each bridge table, a first edge between the additional node and a first node of the pair of nodes, the first edge representing relational information for the bridge table and a first atomic table corresponding with the first node; and generating, for each additional node corresponding with each bridge table, a second edge between the additional node and a second node of the pair of nodes, the second edge representing relational information for the bridge table and a second atomic table corresponding with the second node.

Moreover, in some implementations, the series of acts 900 includes generating the schema graph for the database schema by: determining atomic tables comprising individualized information for entities represented in the database schema and bridge tables comprising relational information for connections between atomic tables; and assigning a node within the schema graph to each atomic table of the atomic tables and each bridge table of the bridge tables.

Additionally, in some implementations, the series of acts 900 includes determining the subset of tables relevant to a natural language query by: generating the description embeddings for the tables in the database schema by processing textual descriptions of the tables in the database schema through an embedding model; generating tokens of the natural language query by processing the natural language query through a tokenizer; and generating the token embeddings for the natural language query by processing the tokens of the natural language query through the embedding model.

Furthermore, in some implementations, the series of acts 900 includes comparing nodes of the schema graph and token embeddings for the natural language query by determining similarity scores between description embeddings for the plurality of atomic tables in the database schema and the token embeddings for the natural language query. Additionally, in some implementations, the series of acts 900 includes determining the subset of tables relevant to the natural language query by: generating description embeddings for the tables in the database schema; generating token embeddings for the natural language query; and determining similarity scores between the description embeddings and the token embeddings.

In addition, in some implementations, the series of acts 900 includes selecting the at least one additional table by: determining a shortest path between the pair of nodes; and determining an additional node on the shortest path, the additional node representing a bridge table comprising relational information for the pair of tables. Alternatively, in some implementations, the series of acts 900 includes selecting the at least one additional table by determining an additional node along the path between the pair of nodes, the additional node representing a bridge table comprising relational information for connections between the pair of tables.

Moreover, in some implementations, the series of acts 900 includes generating the response for the natural language query by generating a structured database query for the natural language query by processing the natural language query and the set of relevant tables through the large language model. Alternatively, in some implementations, the series of acts 900 includes generating the response for the natural language query by processing the natural language query through the large language model with the set of tables to generate a structured database query. Moreover, in some implementations, the series of acts 900 includes generating the response for the natural language query by generating a structured database query from the natural language query based on the set of tables comprising the subset of tables and the at least one additional table.

Additionally, in some implementations, the series of acts 900 includes executing the structured database query on the set of tables to determine a structured database query result; and processing the structured database query result through the large language model to generate a natural language response for the natural language query. Furthermore, in some implementations, the series of acts 900 includes executing the structured database query to determine a structured database query result; and generating a natural language response for the natural language query, the natural language response based on the structured database query result.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
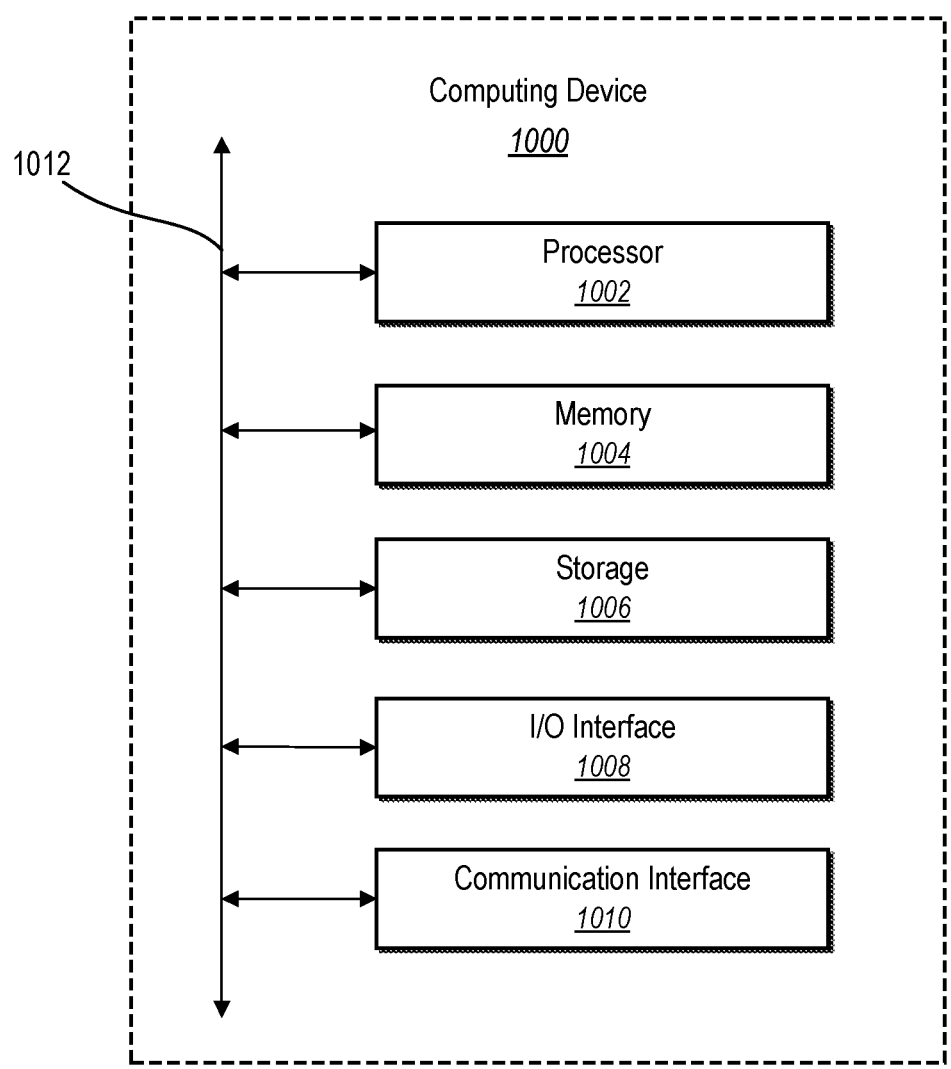
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000, may represent the computing devices described above (e.g., the computing device(s) 800, the server device(s) 106, or the client device 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes the memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes the storage device 1006 for storing data or instructions. As an example, and not by way of limitation, the storage device 1006 can include a non-transitory storage medium described above. The storage device 1006 may include a hard disk drive ("HDD"), flash memory, a Universal Serial Bus ("USB") drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller ("NIC") or network adapter for communicating with an Ethernet or other wire-based network or a wireless NIC ("WNIC") or wireless adapter for communicating with a wireless network, such as a WI-FI. The computing device 1000 can further include the bus 1012. The bus 1012 can include hardware, software, or both that connects components of computing device 1000 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, from tables in a database schema, a subset of tables relevant to a natural language query by comparing description embeddings for the tables in the database schema and token embeddings for the natural language query, wherein description embeddings for the subset of tables relevant to the natural language query satisfy a predefined similarity threshold when compared with the token embeddings for the natural language query;
   selecting, from a schema graph comprising nodes that represent the tables in the database schema, at least one additional table along a path between a pair of nodes representing a pair of tables from the subset of tables relevant to the natural language query;
   determining a set of relevant tables by appending the at least one additional table to the subset of tables relevant to the natural language query, wherein the set of relevant tables comprises fewer tables than a number of the tables in the database schema; and
   generating, from the set of relevant tables, a response for the natural language query by processing text representations of the set of relevant tables through a large language model.

2. The computer-implemented method of claim 1, further comprising generating the schema graph by:
   determining atomic tables within the database schema, the atomic tables comprising individualized information for entities represented in the database schema; and
   assigning a node within the schema graph to each atomic table of the atomic tables within the database schema.

3. The computer-implemented method of claim 2, wherein generating the schema graph further comprises:
   determining bridge tables within the database schema, the bridge tables comprising relational information for a connection between two atomic tables; and
   adding, for each bridge table of the bridge tables within the database schema, an additional node within the schema graph between a pair of nodes representing atomic tables.

4. The computer-implemented method of claim 3, wherein generating the schema graph further comprises:
   for each additional node within the schema graph, generating a first edge between the additional node and a first atomic node of the pair of nodes and a second edge between the additional node and a second atomic node of the pair of nodes,
   wherein the first edge and the second edge represent relational information for a bridge table and corresponding atomic tables.

5. The computer-implemented method of claim 1, wherein determining the subset of tables relevant to a natural language query comprises:
   generating the description embeddings for the tables in the database schema by processing textual descriptions of the tables in the database schema through an embedding model;
   generating tokens of the natural language query by processing the natural language query through a tokenizer; and
   generating the token embeddings for the natural language query by processing the tokens of the natural language query through the embedding model.

6. The computer-implemented method of claim 1, wherein selecting the at least one additional table comprises:
   determining a shortest path between the pair of nodes; and
   determining an additional node on the shortest path, the additional node representing a bridge table comprising relational information for the pair of tables.

7. The computer-implemented method of claim 1, wherein generating the response for the natural language query comprises generating a structured database query for the natural language query by processing the natural language query and the set of relevant tables through the large language model.

8. A system comprising:
one or more memory devices comprising a database schema; and
one or more processors configured to cause the system to:
generate a schema graph for the database schema, the schema graph comprising nodes that represent a plurality of atomic tables comprising individualized information for an entity represented in the database schema and one or more bridge tables comprising relational information connecting two or more atomic tables of the plurality of atomic tables;
determine, from the schema graph for the database schema, a set of tables relevant to a natural language query by comparing nodes of the schema graph and token embeddings for the natural language query, wherein the set of tables comprises fewer tables than a union of the plurality of atomic tables and the one or more bridge tables, and wherein a subset of nodes of the schema graph corresponding to the set of tables relevant to the natural language query each satisfy a predefined similarity threshold when compared with the token embeddings for the natural language query; and
generate, from the set of tables, a response for the natural language query by processing text representations of the set of tables through a large language model.

9. The system of claim 8, wherein the one or more processors are configured to cause the system to generate the schema graph for the database schema by:
determining the plurality of atomic tables from the database schema; and
generating a plurality of nodes within the schema graph, each node of the plurality of nodes representing a corresponding atomic table of the plurality of atomic tables within the database schema.

10. The system of claim 9, wherein the one or more processors are configured to cause the system to generate the schema graph for the database schema further by:
determining the one or more bridge tables from the database schema; and
generating, for each bridge table of the one or more bridge tables within the database schema, an additional node within the schema graph between a pair of nodes of the plurality of nodes.

11. The system of claim 10, wherein the one or more processors are configured to cause the system to generate the schema graph for the database schema further by:
generating, for each additional node corresponding with each bridge table, a first edge between the additional node and a first node of the pair of nodes, the first edge representing relational information for the bridge table and a first atomic table corresponding with the first node; and
generating, for each additional node corresponding with each bridge table, a second edge between the additional node and a second node of the pair of nodes, the second edge representing relational information for the bridge table and a second atomic table corresponding with the second node.

12. The system of claim 8, wherein comparing nodes of the schema graph and token embeddings for the natural language query comprises determining similarity scores between description embeddings for the plurality of atomic tables in the database schema and the token embeddings for the natural language query.

13. The system of claim 8, wherein the one or more processors are configured to cause the system to generate the response for the natural language query by processing the natural language query through the large language model with the set of tables to generate a structured database query.

14. The system of claim 13, wherein the one or more processors are further configured to cause the system to:
execute the structured database query on the set of tables to determine a structured database query result; and
process the structured database query result through the large language model to generate a natural language response for the natural language query.

15. A non-transitory computer-readable medium storing executable instructions that, when executed by a processing device, cause the processing device to perform operations comprising:
generating a schema graph for a database schema, the schema graph comprising nodes that represent tables in the database schema;
determining, from the schema graph for the database schema, a subset of tables relevant to a natural language query by comparing nodes of the schema graph and token embeddings for the natural language query, wherein the subset of tables comprises fewer tables than a number of the tables in the database schema, and wherein a subset of nodes of the schema graph corresponding to the subset of tables relevant to the natural language query each satisfy a predefined similarity threshold when compared with the token embeddings for the natural language query;
selecting, from the schema graph for the database schema, at least one additional table along a path between a pair of nodes representing a pair of tables from the subset of tables relevant to the natural language query; and
generating, from a set of tables comprising the subset of tables and the at least one additional table, a response for the natural language query by processing text representations of the set of tables through a large language model.

16. The non-transitory computer-readable medium of claim 15, wherein generating the schema graph for the database schema comprises:
determining atomic tables comprising individualized information for entities represented in the database schema and bridge tables comprising relational information for connections between atomic tables; and
assigning a node within the schema graph to each atomic table of the atomic tables and each bridge table of the bridge tables.

17. The non-transitory computer-readable medium of claim 15, wherein determining the subset of tables relevant to the natural language query comprises:
generating description embeddings for the tables in the database schema;
generating token embeddings for the natural language query; and
determining similarity scores between the description embeddings and the token embeddings.

18. The non-transitory computer-readable medium of claim 15, wherein selecting the at least one additional table comprises determining an additional node along the path between the pair of nodes, the additional node representing a bridge table comprising relational information for connections between the pair of tables.

19. The non-transitory computer-readable medium of claim 15, wherein generating the response for the natural language query comprises generating a structured database query from the natural language query based on the set of tables comprising the subset of tables and the at least one additional table.

20. The non-transitory computer-readable medium of claim 19, further storing executable instructions that, when executed by the processing device, cause the processing device to perform operations comprising:
- executing the structured database query to determine a structured database query result; and
- generating a natural language response for the natural language query, the natural language response based on the structured database query result.

* * * * *